United States Patent Office

3,014,001
Patented Dec. 19, 1961

3,014,001
PRODUCTION OF GLOSSY, AIR-CURING, NON-INHIBITED POLYESTER COATINGS
Elwood J. Murray, Old Greenwich, Conn., assignor to Reichhold Chemicals, Inc., Detroit, Mich.
No Drawing. Filed Jan. 4, 1957, Ser. No. 632,419
5 Claims. (Cl. 260—28.5)

This invention relates to the preparation of resinous compositions capable of curing at room temperature and to products obtained therefrom which comprise glossy air cured and non-inhibited polyester coatings. More specifically this invention in its preferred embodiment relates to polyester resin composition comprising a mixture of unsaturated alkyd resin and a copolymerizable unsaturated monomer such as styrene, vinyl toluene, etc., an organic peroxide catalyst, a metallic salt drier employed in conjunction therewith, a crystalline wax, and an organic onium bentonite. Included within the scope of this invention is the process of room temperature curing of such polyesters as well as high temperature curing.

Polyesters have been previously catalyzed with organic peroxides capable of generating free radicals when activated at room temperature with promoters such as cobalt naphthenate. Such compositions when protected from contact with air, as in castings or in films between glass or cellophane sheets, are capable of curing to high polymeric form exhibiting hardness, clarity, freedom from tacky surface, and having good resistance to moisture and to most solvents as well as resistance to most chemicals other than strong alkalis.

However, identical compositions cured in films, without protection from air show effects of air-inhibition at the resin-air interface. The effect of air-inhibition can be noted in that the surface commonly is glossy and more or less sticky, although with further aging the surface may reach a tack-free condition. The films, however, will be readily softened by styrene, by acetone, or by other powerful solvents. On immersion in water air-inhibited films swell and turn white, an effect termed "blushing." Thinner films (in the order of 1 to 5 mils) will be more or less completely disintegrated on water immersion; in heavier films the blushing may be limited chiefly to the immediate exposed surface.

It is also well known that air inhibition of polyester coatings cured at room temperature can be overcome by including a substance in the formulation which is sufficiently compatible with and soluble in the liquid resin, but which is highly incompatible and insoluble in the gelled resin immediately prior to complete curing. This incompatible material should separate as an immiscible phase on the surface of the gelled resin, and be present in sufficient concentration at the surface to cover it completely with at least a mono-molecular layer acting as a barrier film separating the resinous coating from contact with the atmosphere.

The best known and most widely used substance for this purpose is a crystalline paraffin wax of suitable melting point-solubility characteristics, having crystallinity characteristics proper for the intended purpose. A proper type of wax serves several useful functions; (1) the formation of a uniform barrier layer on the gelled polyester coating can be readily controlled; (2) an extremely thin wax film has high impermeability to air, as well as a marked retarding effect on the evaporation of free monomer from the polyester film. These features contribute to a high degree of cure in the catalyzed polyester coating, resulting in films which do not blush on contact with water, and which have substantial resistance to strong solvents. In all respects the polyester films containing wax cured at room temperature in the open atmosphere exhibit physical and chemical properties substantially equal to films cured out of contact with air.

While otherwise desirable, the wax-modified polyester coatings are not capable of yielding the desired highly glossy films. Typical gloss reading (Hunter 60′ Glossmeter) vary between 30 and 5, with the average falling between 10 and 15. Within these limits the visual gloss will vary with the amount of wax used (commonly between 0.05% and 0.10% based on the resin), on the ambient temperature, and the crystal habit of the particular wax sample, as well as on other minor factors. These low gloss films can be more or less readily buffed and polished to yield gloss readings of 90 or higher, or just about as glossy as polished black plate glass.

The removal of the very thin paraffinic layer from the fully cured polyester coating might be expected to leave the exposed surface glossy. The step does have some such effect but not to the desired degree. However, the wax crystals are partially imbedded in the hardened plastic surface, and while the wax can be removed with solvents the indentation will remain.

A great deal of work has been done in the search for a replacement for the paraffin wax or for some means to eliminate the necessity of expensive, laborious buffing and polishing operations required for glossy polyester finish. No success has been evident prior to this invention.

According to the teachings of this invention, the addition of an organic onium bentonite (Bentone) to a standard polyester wax modified resin coating composition results in a coating which will air-cure to a glossy film, non-tacky, with substantial resistance to water blushing, and which may be buffed or polished with relatively little effort to brilliant, lustrous finishes. The peculiar action of the additive is not fully understood at the present time, but it is believed that it operates in several complementary ways: first, perhaps, by reason of its gelling action on the styrene monomer, a gel structure may be induced in the liquid film well in advance of the normal gel structure occurring with the first crosslinking of the copolymerization reaction. Second, the gelling action, with respect to the styrene monomer content, will result in a lower loss of monomer by reason of evaporation of absorption. Third, the quaternary ammonium salt of the bentonite is believed to have an appreciable accelerating effect on the free radical type of copolymerization. Fourth, it seems that the type of gel structure induced has an effect in controlling the crystal size of the paraffin wax separating on the surface resulting in microscopic crystals too small to visibly affect the glossy smoothness of the coating. While I believe the above explanation to be correct I do not wish to be confined to any particular theory, but know that the addition of the Bentone additive results in an improved gloss in the film obtained.

It will be understood that in accordance with the present invention any unsaturated alkyd resin may be employed as the principal ingredient of the polyester composition. A suitable alkyd is that known as Polylite 8007, which is a product of Reichhold Chemicals, Inc., Detroit, Michigan, and which may be formed by the esterification of a mixture of maleic and phthalic anhydrides or equivalent ethylenically unsaturated and saturated di-basic acids, with propylene glycol or other diol. "Polylite" is referred to in Reinhold's Condensed Chemical Dictionary, 5th edition, as the proprietary product of Reichhold Chemicals, Inc., and is defined as covering a group of 100% reactive alkyd resins dissolved in styrene and other monomers. Such products are commercially available and are referred to as unsaturated polyesters in the following authoritative book which is dedicated to the Classification Group of the United States Patent Office: Polyesters and Their Applications, Reinhold's Publishing Corporation copyright 1956. See particularly pages 135, 136, 137, 144, 146, 148, 151, etc. Polylite 8007 is an unsaturated polyester of low viscosity and is particularly suitable for the formulation of coating mixes.

Any suitable polymerization catalyst may be employed, particularly an organic peroxide capable of generating free radicals when activated at room temperature with promoters of the metallic salt dried type such as cobalt-naphthanate. A suitable peroxide catalyst is methyl ethyl ketone peroxide, but the invention is not limited to the use of this particular compound as many others may be employed within the scope of the invention, as for example, benzoyl peroxide, lauroyl peroxide, or other equivalent polymerization catalyst, as will be apparent to those skilled in the art.

Likewise, promoters other than cobalt naphthanate may be employed, particularly metallic salt driers such as the salts of polyvalent metals and unsaturated organic acids, as for example, aluminum, calcium, cobalt, lead, manganese, and zinc linoleates, naphthanates or resinates.

While styrene is preferred as the copolymerizable monomer for use with a polyester other unsaturated monomers may be employed, particularly copolymerizable vinyl monomers. The quantity of the monomer employed may be widely varied, but should preferably be substantially less by weight than the polyester resin, and good results are obtained using from 10 to 20% by weight of the monomer.

Also various types of crystalline waxes may be employed within the scope of my invention, though paraffine wax is preferred on account of its availability and other desirable properties.

Organic onium bentonite compounds, including the quaternary ammonium compounds, are well known products and are fully disclosed in the following patent: 2,531,427, Hauser, Nov. 28, 1950. Such compounds are commercially known in the art under the trademark "Bentone," which is a proprietary name owned by National Lead Company, and covered by trademark registration No. 544,075, specific individual products being designated by numerals following the name "Bentone," as for example Bentone 18C, Bentone 34 and Bentone 38, which are organic quaternary ammonium bentonite compounds. Bentone 34, for example, is dimethyldioctadecylammonium bentonite, while Bentone 18C and Bentone 38 are closely related organic onium bentonites. "Bentones" are likewise referred to in the following patent: 2,642,403, Simon et al., June 16, 1953.

In the above patent "Bentones" are referred to as bentonite salts of quaternary ammonium compounds, and "Bentones" 34 and 38 are specifically referred to in said patent.

The quantity of Bentone employed may be widely varied, but desirably should be within the approximate range of 1 to 10% by weight of the polyester, and good results are obtained using approximately 5% by weight of the bentonite complex.

In carrying out my invention the dispersion of the bentonite complex in a styrene monomer may first be prepared, and such dispersion added to a polyester composition containing, in addition to the polyester, a small quantity of wax, a metallic salt drier, a peroxide catalyst, and if desired an additional quantity of unsaturated monomer such as styrene, together with a small quantity of alcohol for the purpose of reducing the thixotropic consistency so as to permit easy spraying.

The mixture, when allowed to dry, forms a coating having a higher gloss without buffing than that of any similar composition known to me, formed without the addition of bentonite complex, and is capable of producing with superficial polishing an exceptionally lustrous and brilliant film.

The invention will be more readily understood by reference to the accompanying specific examples, which are intended as illustrative only rather than as limiting the invention to the specific details set forth herein.

*Example 1*

100 grams of proprietary organic onium bentonite (Bentone 18C, National Lead Co.) and 400 grams of styrene monomer are milled in a pebble mill for 16 hours. After this time the composition is a smooth, highly thixotropic, dark-brown dispersion which changes from a non-flowing pulp to a highly fluid liquid upon stirring.

*Example 2*

A standard type of air-inhibited polyester coating resin (identified as polylite 8007) consisting of 60% of an unsaturated alkyd (composition product of esterification of mixture of maleic and phthalic anhydrides, with propylene glycol) and 40% of copolymerizable monomer such as styrene, is used to prepare a coating, using as a formulation:

100 parts Polylite 8007
0.5 parts 6% cobalt naphthenate solution
20 parts styrene monomer, polymer grade
1.5 parts 60% methyl ethyl ketone peroxide This catalyzed composition was sprayed on an upright wooden surface. Because of the low inherent viscosity only 3 or 4 mils of film could be applied without serious draining. This coating gelled in about 60 minutes. After air-curing overnight the film (4 mils) is very glossy (about 90 on Hunter 60' Glossmeter), is quite tacky, is much too sticky to sand or to polish, and is softened very readily by toluol. Films immersed in water turn white within 30 minutes and eventually disintegrate.

*Example 3*

The composition mentioned in Example 2 is further modified by addition of paraffin wax. The complete formulation would be:

100 parts Polylite 8007
0.075 part paraffin wax, mp. 130° F.
0.50 parts 6% cobalt naphthenate solution
20 parts styrene
1.5 parts 60% methyl ethyl ketone peroxide This catalyzed coating was sprayed on an upright wooden panel. As with the product of Example 2, the product of Example 3 is also too fluid to apply in film thickness much above 3 or 4 mils without excessive sagging. This coating gelled in about 60 minutes and had substantial hardness in 3 or 4 hours. After air-curing overnight the film (4 mils) is exceptionally hard and mar-resistant. The film is not affected by acetone or by toluol allowed to evaporate from the surface. In water the films show no signs of attack after 8 hours immersion. The surface has a uniform low sheen and reads about 15 on Hunter 60' Glossmeter. After buffing and polishing the films have good clarity and gloss, reading about 90 on the Glossmeter.

*Example 4*

The composition mentioned in Example 3 is further modified by the addition of the Bentone (18C) dispersion mentioned in Example 1. Broken down into component parts for simplificaition in making comparisons, the formulation would be:

100 parts Polylite 8007
0.075 part paraffin wax, mp. 130° F.
0.50 part 6% cobalt naphthenate solution
5.0 parts organic onium bentonite (Bentone 18C)
20 parts styrene monomer
0.5 part denatured ethyl alcohol
1.5 parts methyl ethyl ketone peroxide This catalyzed coating was sprayed on an upright wooden panel. In contrast with the product of Examples 2 and 3, the product of Example 4 can be sprayed in very heavy coats if desired with excellent resistance to sagging. Addition of a minor amount of ethyl alcohol reduces the thixotropic consistency very greatly, permitting easy spraying. A substantial amount of the ethyl alcohol is evaporated in the spray mist and the deposited coating reverts substantially to the original highly thixotropic consistency, thereby controlling the flow of the wet coating allowing application of films as thick as 15 or 20 mils in one application without noticeable sagging on an upright surface.

This coating does not have a clearly defined "gel time"; it appears to be well set and dust-free in 90 to 180 minutes. After air-curing overnight the film (5 mils) is free of tack. Gloss prior to any buffing or polishing is over 95 on the Glossmeter. The film at this stage is hard enough to buff and polish using the methods employed in polishing furniture lacquers. With superficial polishing exceptionally lustrous and brilliant films are obtained.

After air-curing overnight this film immersed in water shows a white surface blush in about 30 minutes; after immersion for four hours the panel was removed and allowed to dry. A whitish powder could be brushed from the blushed areas revealing a glossy surface beneath; the film shows no other effects apart from the skin surface. If the surface skin is buffed off by very light polishing the remaining film can be immersed in water for more than 8 hours without any signs of blushing.

The original film after air curing overnight is slightly soft compared to the film in Example 3 and mars more readily. The film hardness is nevertheless very much superior to that of an oleoresinous marine spar varnish of comparable water resistance. The films continue to improve somewhat in hardness with age, but do not become quite as hard as the films cited in Example 3. After aging 3 to 7 days Sward Rocker Hardness of 40 to 60 is usual; pencil hardness is above 6-H.

Films air-cured, buffed and un-buffed, have been under examination at an interior exposure for more than 6 months and to date no indications of blooming or degradation of gloss or fullness have been noted.

*Example 5*

Other representative samples of proprietary organic onium bentonites were evaluated in a screening test using plastic castings (about 1.5 inch cubes) and in the compositions given below. The modified bentonites were milled with the polyester resin to obtain optimum dispersion.

|  | I | II | III | IV |
|---|---|---|---|---|
| Polylite 8007 | 100 | 100 | 100 | 100 |
| Paraffin wax, 130° F., M.P | 0.075 | 0.075 | 0.075 | 0.075 |
| 6% cobalt naphthenate solution | 0.50 | 0.50 | 0.50 | 0.50 |
| styrene monomer | 10.0 | 10.0 | 10.0 | 10.0 |
| Bentone 18C | 5.0 | x | 2.5 | x |
| Bentone 34 | x | 5.0 | 2.5 | x |
| Bentone 38 | x | x | x | 5.0 |
| 60% methyl ethyl ketone peroxide | 1.0 | 1.0 | 1.0 | 1.0 |
| Barcol hardness, 24 hours, air-cured: | | | | |
| air-exposed surface | 32 | 0 | 32 | 0 |
| interior surface | 32 | 20 | 30 | 10 |
| Barcol hardness, 12 days, air-cured: | | | | |
| air-exposed surface | 35 | 0 | 35 | 0 |
| interior surface | 35 | 25 | 35 | 10 |

It is quite evident that 5-I is especially effective in curing the polyester at the air-exposed surface, and since it is known that 5-II and 5-IV are more efficient gelling agents in this type of system, the conclusion is that 5-I is effective in reducing air-inhibition for reasons not wholely attributable to its gelling effect, although this is an assumption on our part.

The invention has been described in detail for the purpose of illustration but it will be obvious that numerous modifications and variations may be resorted to without departing from the spirit of the invention as defined in the accompanying claims.

I claim:

1. A liquid wax modified polyester varnish type coating composition capable of curing in contact with air without inhibition to form a film having a high gloss, good film hardness, good polishing characteristics, excellent clarity and good moisture resistance, comprising (A) a polymerizable unsaturated polyester composition including (1) an unsaturated linear alkyd resin of an aliphatic dihydric alcohol and an alpha-beta ethylenically unsaturated dicarboxylic acid, (2) a copolymerizable vinyl monomer, (B) a small amount of a dispersion of an organic onium bentonite and (C) a small amount of a crystalline paraffin wax; the quantity of the organic onium bentonite being about 1-10% by weight of the resin, the quantity of vinyl monomer being about 10-20% by weight of the resin, and the quantity of the wax being about 0.05% to 0.10% by weight of the resin.

2. A coating composition as set forth in claim 1 wherein the vinyl compound is styrene.

3. A coating composition as set forth in claim 1, wherein the organic onium bentonite dispersion includes dimethyldioctadecyl ammonium bentonite.

4. A coating composition as set forth in claim 1, wherein the alkyd resin is the esterification product of (1) a mixture of maleic and phthalic anhydrides and (2) a diol.

5. A liquid wax modified polyester varnish type coating composition capable of curing in contact with air without inhibition to form a film having a high gloss, good film hardness, good polishing characteristics, excellent clarity and good moisture resistance, comprising (A) a polymerizable unsaturated polyester composition including (1) an unsaturated linear alkyd resin of an aliphatic dihydric alcohol and an alpha-beta ethylenically unsaturated dicarboxylic acid, (2) a copolymerizable vinyl monomer, (B) a small amount of a dispersion of an organic onium bentonite and (C) a small amount of a crystalline paraffin wax; the quantity of the organic onium bentonite being about 1-10% by weight of the resin, the quantity of vinyl monomer being about 10-20% by weight of the resin, and the quantity of the wax being about 0.05% to 0.10% by weight of the resin; the alkyd resin comprising the esterification product of (a) a mixture of maleic and phthalic anhydrides and (b) propylene glycol, and the vinyl monomer comprising styrene.

References Cited in the file of this patent

UNITED STATES PATENTS

| 2,388,326 | Hyden et al. | Nov. 6, 1945 |
| 2,751,775 | Sergovic | June 26, 1956 |
| 2,843,556 | Moorman | July 15, 1958 |